XR 3,837,827

United Sta[tes Patent]
Carruthers et al.

[11] 3,837,827
[45] Sept. 24, 1974

[54] METHOD FOR PRODUCING OPTICAL WAVEGUIDING LAYERS IN SOLID TRANSPARENT MEDIA

[75] Inventors: John Robert Carruthers, Murray Hill; Ivan Paul Kaminow, New Shrewsbury, both of N.J.

[73] Assignee: Bell Telephone Laboratories, Incorporated, Murray Hill, N.J.

[22] Filed: Jan. 18, 1973

[21] Appl. No.: 324,884

[52] U.S. Cl............................ 65/30, 65/32, 65/33, 350/96 WG
[51] Int. Cl...................... C03c 15/00, C03b 29/00
[58] Field of Search........ 65/30, 33, 32; 350/96 WG

[56] References Cited
UNITED STATES PATENTS

| | | | |
|---|---|---|---|
| 2,982,053 | 5/1961 | Elmer | 65/30 X |
| 3,573,939 | 4/1971 | Beall | 65/33 |
| 3,647,406 | 3/1972 | Fisher | 65/30 |
| 3,741,740 | 6/1973 | Pirooz | 65/33 |
| 3,756,798 | 9/1973 | Ernsberger | 65/32 |

OTHER PUBLICATIONS

Handbook of Glass Manufacture, Volume II, Fay V. Tooley – Ogden Publishing Co., Pages 192–199

*Primary Examiner*—S. Leon Bashore
*Assistant Examiner*—Frank W. Miga
*Attorney, Agent, or Firm*—P. V. D. Wilde

[57] ABSTRACT

The specification describes a method for producing light guiding layers in transparent crystals, such as $LiNbO_3$ and $LiTaO_3$, by selectively outdiffusing the $Li_2O$ component, by heating above 1,000° C in a non-reactive environment thereby effecting a change in the refractive index of the surface portion of the crystal. Effective light guiding layers in acoustooptic and electrooptic devices based on these crystals can be produced by this technique.

6 Claims, 6 Drawing Figures

METHOD FOR PRODUCING OPTICAL WAVEGUIDING LAYERS IN SOLID TRANSPARENT MEDIA

This invention relates to processes for the manufacture of optical devices such as those used in optical communications.

Recent advances in optical device technology make it appear that practical and economic optical communications may be very near to fruition. These advances include improvements in optical thin film circuits, signal processing and terminal equipment in general, and most significantly, improved optical transmission in solid transparent materials through the use of light guiding principles.

Optical light guides are based upon the well-known principle of internal light reflection. The light signal is transmitted through a medium that is surrounded by a confining medium, confining in the sense that it possess a lower refractive index than the transmission medium. The simplest structure that utilizes this principle is a solid transmission medium in air. However, for practical transmission systems that include long travel distances, the light guide must be highly efficient, and this requires very close control of the interface between the transmission and confining media. It is generally believed that scattering losses at solid-solid interfaces are easier to control within acceptable limits than those at a solid-to-air interface. A solid-solid interface is clearly easier to maintain.

Therefore, most of the recent efforts toward achieving low loss optical transmission media have been with "clad" media, i.e., a solid transmission medium surrounded by a solid having lower refractive index. Considerable success has been obtained with clad glass fibers.

Similar attempts have been made to produce waveguiding layers in electrooptic, acoustooptic and magnetooptic crystals. The methods used include indiffusion, ion implantation and epitaxial growth. These have met with more limited success. In fact, a low loss optical guide in a crystal of high electrical resistivity (to allow the application of modulating fields) suitable for use in an electrooptic or acoustooptic modulator has not yet been reported.

This invention is directed to a process for producing optical waveguiding layers in solid transparent media. It is capable of producing waveguiding layers along the surface of a host medium.

The method of the invention relies on selective outdiffusion of solid constituents from a geometrically shaped body to produce a surface layer on the body that is relatively deficient in the diffusing constituent. If the chemistry of the system is favorable, that layer will have, with respect to the host material, a higher or lower index of refraction. The region of higher index, either the layer or the host, is the optical waveguiding layer. The chemical systems found most susceptible to this treatment and which, in addition, seem to have good potential as optical media, are mixed oxides having at least two components. The system can be described generally as $(A_mO)_x (B_nO)_{1-x}$ where $m$ and $n$ are variable indices depending upon the valences of cations A and B, respectively, and $x$ is variable over a finite range of at least 0.001. In order for the selective diffusion process to be effective, it is necessary that one of these components be volatile relative to the other. Specifically, that component must have both a higher vaporization pressure and higher diffusion coefficient in that particular system. In order to obtain a useful preferential effect, these parameters should differ by at least three orders of magnitude.

Processing the system to obtain selective outdiffusion is relatively straighforward to those versed in the thermodynamics of solids. The process involves simply heating the geometric body, usually in vacuum, for a time period sufficient to deplete the surface region of the body of the relatively volatile constituent. The relevant parameters are simply time and temperature. The selection of these will depend on the refractive index profile desired in the body.

the refractive index profiles can be represented by the complementary error function:

$$\Delta n_3 = \alpha \; \text{erfc} \; (s/\beta),$$

(1)

where $\alpha$ is a constant, $s$ is the depth below the surface of the body and $\beta = 2\sqrt{Dt}$ with $t$ the time and D the diffusion constant. In general, to obtain light guiding, $\Delta n_e$ should exceed $10^{-4}$. For realistic cases the effective thickness of the guiding layer will be greater than one micron.

Determining the constants and, in general, predicting the outdiffusion, is complicated by a lack of knowledge of the diffusion mechanisms in complex oxide systems. Diffusion and vaporization processes in these solids may involve either A, B and O ions separately or $A_mO$ and $B_nO$ molecular groups. In each case there is more than one ion or molecular group diffusing and evaporating; however, one specie will tend to predominate. Finally, no way is known for predicting the effect on refractive index of small changes in stoichiometry in a given chemical system. These index changes are related to the tensor polarizabilities of the constituents and the change in physical density with stoichiometry.

Fortunately, however, the determination of the outdiffusion behavior of the system is straightforward and guidelines for the selection of appropriate multicomponent systems and for the general practice of the invention are available.

The following table lists several oxides giving the respective temperatures for which the vaporization pressures are equal to $10^{-2}$ Torr.

TABLE

| | |
|---|---|
| $P_4O_{10}$ | 115 |
| $SeO_2$ | 124 |
| $As_4O_6$ | 136 |
| $CrO_3$ | 195 |
| GeO | 451 |
| $Sb_2O_3$ | 457 |
| $Tl_2O$ | 463 |
| $Sc_2O_3$ | 550 |
| SnO | 584 |
| $MoO_3$ | 646 |
| $TeO_2$ | 652 |
| PbO | 720 |
| $K_2O$ | 727 |
| CdO | 809 |
| $Na_2O$ | 827 |
| $IrO_3$ | 990 |
| ZnO | 1057 |
| SiO | 1020 |
| $WO_3$ | 1176 |
| $In_2O$ | 1270 |
| $Li_2O$ | 1303 |
| $Ga_2O$ | 1450 |
| $B_2O_3$ | 1450 |
| NiO | 1485 |

TABLE-Continued

| | |
|---|---|
| BaO | 1549 |
| CoO | 1551 |
| FeO | 1641 |
| SrO | 1727 |
| NbO$_2$ | 1800 |
| TaO$_2$ | 1800 |
| TiO | 1845 |
| MgO | 1855 |
| VO | 1966 |
| CaO | 2050 |
| La$_2$O$_3$ | 2126 |
| BeO | 2217 |
| Al$_2$O | 2245 |
| ZrO$_2$ | 2406 |
| Y$_2$O$_3$ | 2412 |
| HfO$_2$ | 2678 |

From this Table, oxides can be selected on the basis of the rule recommended earlier, i.e., a difference of at least three orders of magnitude in their vaporization pressures. This corresponds to a temperature differential in the Table of approximately 150°C. It remains to be determined that the more volatile has a faster diffusing cation constituent, again by at least three orders of magnitude. These values are obtainable in the technical literature. They are favorable for the LiNbO$_3$ and LiTaO$_3$ systems.

Having selected an appropriate system, a crystal body having the composition selected is heated, usually in a vacuum, to evaporate the volatile constituent from the surface. The rate of vaporization increases approximately exponentially with temperature. Therefore, to determine the behavior of the system, it is expedient to raise the temperature to near the melting point, or where possible to just below the Curie point if it is a poled ferroelectric or ferromagnet. In systems that, in a practical sense, are susceptible to this treatment, the vaporization flux will exceed $10^{-10}$ gms/cm$^2$/sec. The stoichiometric change can be estimated based on the observed weight loss. It will ordinarily be important to restrict the stoichiometric change within compositional limits allowed by the crystal structure. Crystal phase changes tend to perturb the boundary, introducing scattering losses and internal strains.

It is also important to select the system so that the vaporization flux from the surface is less than the diffusion flux to the surface. Otherwise, the surface etches faster than it is depleted.

The process of the invention was demonstrated in two specific systems as described in the following detail. In the drawing.

The outdiffusion technique was shown to be particularly applicable to crystals which have at least the structure of the formula given above in which A$_m$O is Li$_2$O and B$_n$O is taken from Table I following the rules given. The system may include additional components as well. Li$_2$O is especially attractive as one constituent because it is relatively volatile and diffuses rapidly.

Experimental data obtained with samples of LiNbO$_3$ and LiTaO$_3$ show that these materials are particularly attractive in the context of the invention. These materials are known to be useful for electrooptic and acoustooptic devices. As indicated earlier, the obtaining of suitable high quality waveguiding layers in electrooptic and acoustooptic materials had not been perviously reported. An optical communications system requires, in addition to the optical fiber transmission medium, signal processing devices in both terminal and repeater equipment. The crystals described in these experiments are especially useful in these device applications.

Both of these materials can crystallize in a slightly nonstoichiometric form $(Li_2O)_x (M_2O_5)_{(1-x)}$, where M = Nb or Ta and $x$ ranges between 0.48 and 0.50.

It is known that in LiNbO$_3$, and probably in LiTaO$_3$ as well, that the ordinary index $n_o$ is independent of $x$; but, within the allowed range, the extraordinary index $n_e$ increases approximately linearly as $x$ decreases. For LiNbO$_3$, $dn_e/dx \sim -1.63$; and for LiTaO$_3$, $dn_e/dx \sim -0.85$. Hence, reducing $x$ at the surface results in an optical guiding layer. The following specific procedures demonstrate the applicability of the process of the invention to these crystal materials.

A poled LiNbO$_3$ crystal (I-2), with dimensions (15 × 2 × 5) mm along $(a,b,c)$ crystal axes, respectively, was placed in a Mettler Thermogravimetric microbalance. This instrument allows the weight of the sample to be monitored while it is heated in a vacuum. The sample was held at T = 1,100°C, and 6 × 10$^{-6}$ Torr, for $t$ = 21 hr during which time a weight loss W of $\sim$180$\mu$g was recorded. For practical processing periods a vacuum greater than $10^{-4}$ Torr is recommended for both LiNbO$_3$ and LiTaO$_3$ crystals. In order to remove any discoloration of the crystal, air was then admitted while the sample was maintained at 1100 degrees C for 2 hr. Another crystal (I-3) was similarly treated at 1,100°C for 64 hr and experienced a weight loss of 480 $\mu$g, while a third sample (I-5) treated at 1,100°C for 135 hrs experienced a weight loss of 620 $\mu$g. The samples were clear, colorless and well polished before and after treatment. Quoted absolute weight losses are uncertain to +100, −0 $\mu$g because of initial transients in the electrobalance during the heating cycle. Continuous monitoring in the steady-state indicates a large initial rate of weight loss crudely approximating the law $W \sim t^{1/2}$ expected for a diffusion process.

Figure 1A:
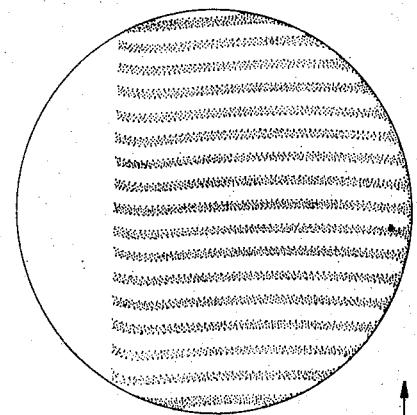
FIGS. 1A to 1D are schematic representations of refractive index profiles obtained in various samples by the outdiffusion technique of the invention.
Figure 1B:
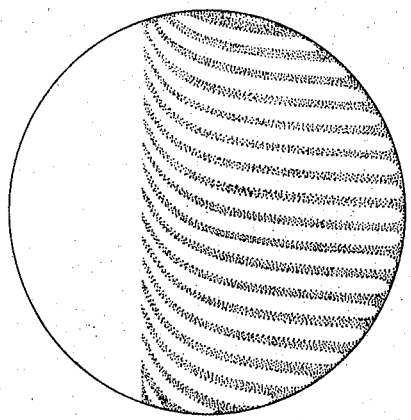
Figure 1C:
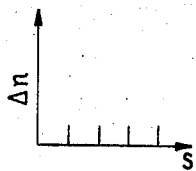
Figure 1C:
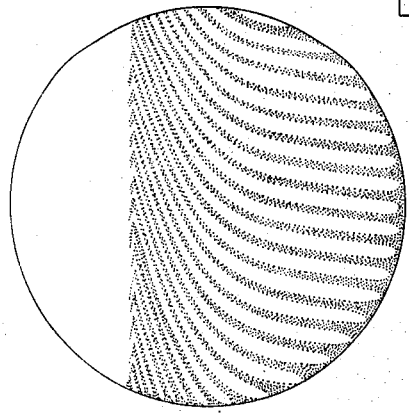
Figure 1D:
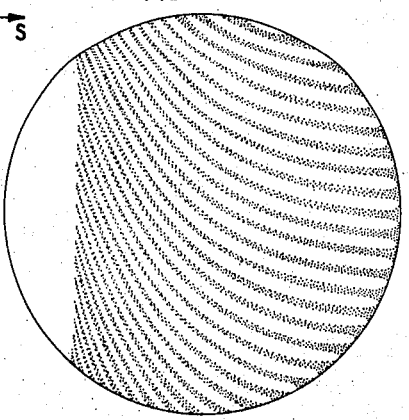

Refractive index profiles normal to the surfaces were measured with a Leitz interference microscope. With this instrument interference fringes, in polarized light, can be observed with a resolution of $\sim$2 $\mu$m. Interferograms through the $(a,c)$ face of (I-2) are shown in FIG. 1A. The edge in FIG. 1A is normal to the c-axis and the light (Hg lamp) is an ordinary wave. Only a very small ordinary index change $\Delta n_o$ is observed. The index change $\Delta n$ is given by $\Delta n = p\lambda/d$, where $p$ is the number of fringes by which the interference pattern in the graded region is shifted from the unperturbed pattern, $\lambda$ is the wavelength (0.546 $\mu$m) and $d$ is the sample thickness (2,000 $\mu$m). The fringe shift depicts the index profile directly. A substantial positive index gradient is observed with extraordinary light in FIG. 1B, where the edge again is normal to the c-axis corresponding to outdiffusion along the c-axis. The extraordinary index change is increased in FIG. 1C, where the edge is parallel to the c-axis corresponding to outdiffusion normal to the x-axis. The interferogram of FIG. 1D illustrates the still greater outdiffusion experienced by (I-3) under observation conditions comparable to those in FIG. 1C for (I-2).

Figure 2:
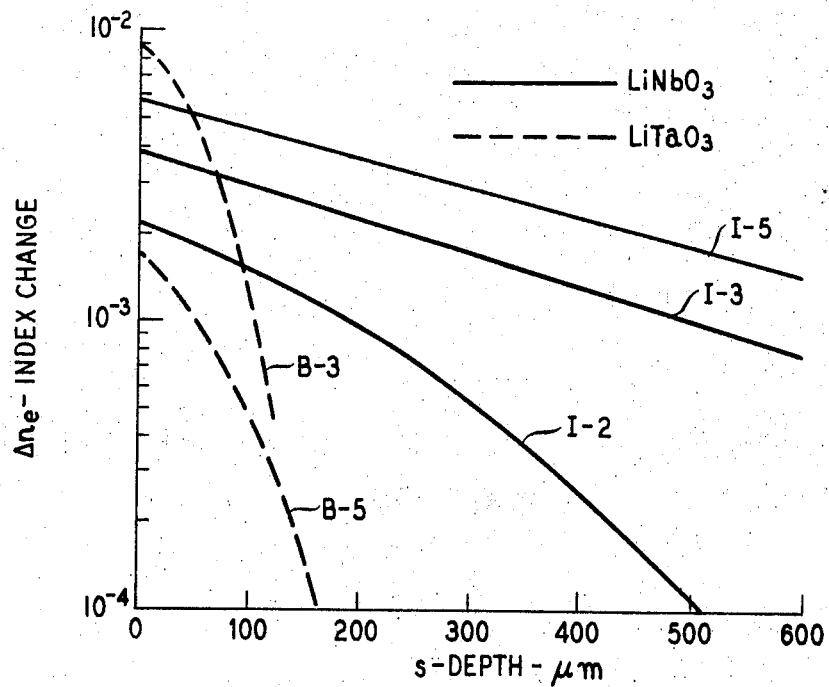
FIG. 2 is a plot of the refractive index variation from the surface of various crystal bodies subjected to the selective outdiffusion process of the invention.

Experimental index profiles for diffusion normal to the c-axis are plotted in FIG. 2. The curves are well represented by the complementary error function of Equation (1).

The constants (I-3) are $A = 4 \times 10^{-3}$, $B = 530$ $\mu m$, $D = 3 \times 10^{-9}$ cm$^2$/sec for diffusion normal to $c$; and $A = 2 \times 10^{-3}$, $B = 530$ $\mu m$, $D = 3 \times 10^{-9}$ cm$^2$/sec for diffusion along $c$. The weight losses calculated from (1) and $dn_e/dx$ on the assumption of only (Li$_2$O) evaporation are 25, 70 and 120 $\mu g$ for specimens (I-2), (I-3), and (I-5), respectively. As these values are considerably less than the measured losses, other components must contribute to W. Since the diffusion coefficient of oxygen in LiNbO$_3$ is $10^{-10}$ cm$^2$/sec at 1,100°C, which is comparable with D values quoted above, these losses may include oxygen evolution with concomitant Nb$^{5+}$ → Nb$^{4+}$ reduction. Both (Li$_2$O) and oxygen losses have been previously reported for LiNbO$_3$ heated in a vacuum. Losses due to (NbO$_2$) are not expected to be significant at 1,100°C since the vapor pressure of pure (NbO$_2$) is only $10^{-5}$ that of pure Li$_2$O.

A refractive index gradient of the form (1) will guide light along the surface $s = 0$ when $\alpha$ is positive and when the direction of propagation has a sizeable vector component normal to the $c$-axis. It can be shown that the number of guided modes, $q$, is approximately given by $$q \sim B/\lambda(2\pi n_e A)^{1/2} \quad (2)$$

for $q$ large. The refractive indices of LiNbO$_3$ measured at $\lambda = 0.63$ $\mu m$ are $n_e = 2.214$ and $n_o = 2.294$. The three samples described above support many modes; e.g., for (I-3) with diffusion normal to $c$, $q \sim 198$.

Figure 3:
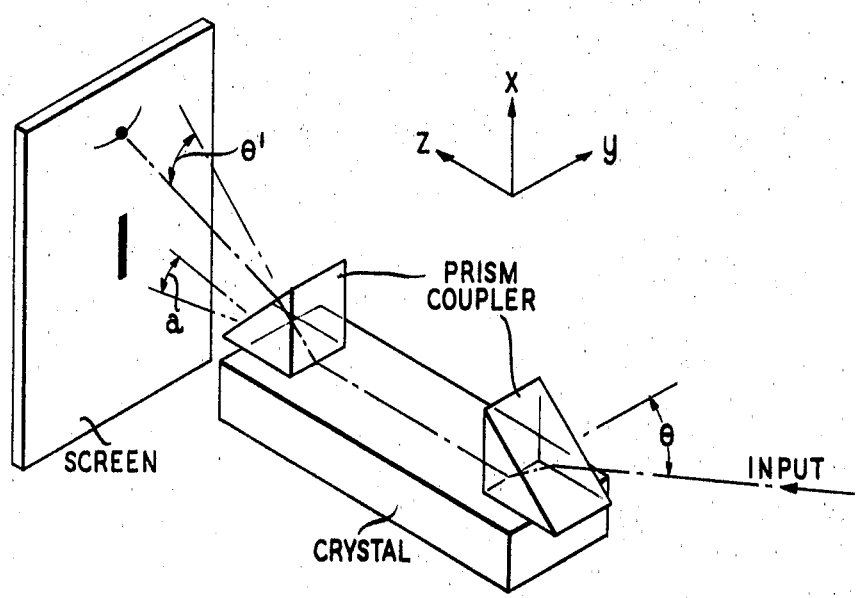
FIG. 3 is a schematic view of an experimental arrangement used to observe light guiding in samples prepared according to the invention.

Guiding can be demonstrated with the prism coupler arrangement shown in FIG. 3, where crystals are oriented with $(a,b,c)$ along $(z,x,y)$ and the incident beam is polarized as an extraordinary (TE) wave. A bright streak appears along the surface when $\theta$ is adjusted near an angle $\theta_o$ slightly less than the critical angle. There is no observable decay in the strength of the scattered light over the 1 cm length of the streak, suggesting that the loss is $\lesssim$ 1 dB/cm. The mode radiates from the end of the guide producing a far-field pattern narrow in the $y$-direction but elongated in the $x$-direction. Measurement of the beam angle $\alpha$ provides an estimate for the extent $h$ of the field in the x-direction in the guide: $h \sim \lambda/\alpha$. For (I-3), $h \sim 10$ $\mu m$ indicating that the optical energy for the low order modes being coupled is confined to the neighborhood of maximum $\Delta n_e$ near $s = 0$.

An output prism coupler produces a well-defined spot at $\theta' = \theta_o$ when $\theta = \theta_o$. A faint "$m$-line" passes through the spot indicating only minor scattering into degenerate modes propagating in other directions in the plane. Waveguiding, as demonstrated by the coupled-out spot, exists over a range of angles $\Delta\theta_o$. Calculation shows that $\Delta\theta_o$ for each sample corresponds to a range of waveguide propagation constants $\Delta\beta$ given approximately by $2\pi A/\lambda$. Thus, the waveguide supports a large number of unresolved modes. In order to produce guides that support only a few low order modes, the product $A^{1/2}B$ must be reduced by adjustment of $t$ and $T$.

The melting and Curie temperatures, $T_m$ and $T_c$, of LiNbO$_3$ are functions of $x$; $T_m$ is about 1,238°C and $1,100 < T_c < 1,180$°C for $0.48 < x < 0.50$. The dc linear electrooptic coefficient, $r_c$, of the bulk crystals was found to be the same before and after treatment, confirming that the crystals are not depoled by the outdiffusion process at $T < T_c$. It is recommended that to give a useful outdiffusion effect temperatures in excess of 1,000°C be used.

Guiding layers of excellent quality were also observed in LiTaO$_3$. Although LiTaO$_3$ and LiNbO$_3$ are isomorphic, $T_m$ for the former is $\sim 1,650$°C and $T_c \sim 600$°C. Outdiffusion at 600°C is too slow to be of interest, and samples were treated at higher temperatures. Temperatures above 1,100°C are recommended. The treated samples were found to be depoled and, although guiding was not affected, they must be repoled in order to be useful in electrooptic or acoustooptic applications.

The index profiles for diffusion normal to $c$ in two LiTaO$_3$ crystals are shown in FIG. 2. One crystal (B-5) was treated at 1,150°C for 3 hrs. and the other (B-3) at 1,400°C for 20 minutes. The diffusion parameters for (B-5) are: $A = 1.7 \times 10^{-3}$, $B = 130$ $\mu m$, $D = 4 \times 10^{-9}$ cm$^2$/sec; and for (B-3): $A = 9 \times 10^{-3}$, $B = 106$ $\mu$, $D = 25 \times 10^{-9}$ cm$^2$/sec. Thus, A and D increase rapidly with T. Since $A^{1/2}B$ is smaller for these samples than for the LiNbO$_3$ samples, $q$ is smaller. Indeed, several discrete modes can be observed with the output prism coupler.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. A process for forming a light guiding layer along a surface of a lithium niobate crystal comprising heating the crystal at a temperature above 1,000°C in an environment that is nonreactive with the crystal for a period sufficient to change the index of refraction of a layer along the surface of the crystal to a depth of at least one micron by at least $10^{-4}$, and providing means for introducing light selectively into that surface layer in a direction having a significant vector component normal to the c-axis of the crystal.

2. A process for forming a light guiding layer along a surface of a lithium tantalate crystal comprising heating the crystal at a temperature above 1,100°C in an environment that is nonreactive with the crystal for a period sufficient to change the index of refraction of a layer along the surface of the crystal to a depth of at least one micron by at least $10^{-4}$, and providing means for introducing light selectively into that surface layer in a direction having a significant vector component normal to the c-axis of the crystal.

3. The process of claim 1 in which the environment is a vacuum of less than $10^{-4}$ Torr.

4. The process of claim 2 in which the environment is a vacuum of less than $10^{-4}$ Torr.

5. The process of claim 3 further including heating the crystal in air to a temperature above 1,000°C.

6. The process of claim 4 further including heating the crystal in air to a temperature above 1,000°C.

* * * * *